United States Patent [19]

Anderson et al.

[11] 3,717,635
[45] Feb. 20, 1973

[54] HYDRAZINO AND SUBSTITUTED HYDRAZINO PYRIDAZINE-N-OXIDES

[75] Inventors: Paul L. Anderson, Dover; William J. Houlihan; Robert E. Manning, both of Mountain Lakes, all of N.J.

[73] Assignee: Sandoz-Wander, Inc., Hanover, N.J.

[22] Filed: Feb. 22, 1971

[21] Appl. No.: 117,766

Related U.S. Application Data

[63] Continuation-in-part of Ser. No. 111,157, Jan. 29, 1971, abandoned, which is a continuation-in-part of Ser. No. 40,697, May 26, 1970, abandoned.

[52] U.S. Cl. .........260/250 A, 424/250, 260/247.5 R
[51] Int. Cl. .............................................C07d 51/04
[58] Field of Search.......................260/250 A, 247.5

[56] References Cited

UNITED STATES PATENTS 3,579,517   5/1971   Houlihan et al. ................260/250 A
3,586,681   6/1971   Houlihan ........................260/250 A Primary Examiner—Nicholas S. Rizzo
Attorney—Gerald D. Sharkin, Frederick H. Weinfeldt, Robert S. Honor, Walter F. Jewell, Richard E. Vila, Thomas O. McGovern and Thomas C. Doyle

[57] ABSTRACT

Hydrazino and substituted hydrazino pyridazine-N-oxides, e.g., 6-chloro-3-hydrazinopyridazine-N-oxide or 6-ethylamino-3-(2-isopropylidene hydrazino)pyridazine-N-oxide, are prepared from 3,6-dihalopyridazine-N-oxides, 3-halo-6-substituted aminopyridazine-N-oxide or 6-halo-3-substituted aminopyridazine-N-oxide and are active as hypotensive/anti-hypertensive agents.

11 Claims, No Drawings

HYDRAZINO AND SUBSTITUTED HYDRAZINO PYRIDAZINE-N-OXIDES

This application is a continuation-in-part of copending application Ser. No. 111,157, filed Jan. 29, 1971, now abandoned, which in turn is a continuation-in-part of copending application Ser. No. 40,697 filed May 26, 1970, now abandoned.

This invention concerns pyridazine-N-oxides and processes for their preparation. More particularly, this invention concerns halo-substituted hydrazino and substituted hydrazinopyridazine-N-oxides and amino-substituted hydrazino and substituted hydrazinopyridazine-N-oxides, certain acid addition salts thereof and methods for their preparation.

The compounds of this invention may be represented by the formula:

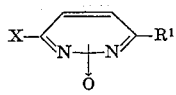

(I)

where

O is oxygen and is bonded to either nitrogen in the ring;

X is halo having an atomic weight of about 35 to 80

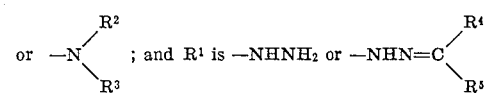

where $R^2$ represents hydrogen, lower alkyl, i.e., alkyl having one to four carbon atoms, such as methyl, ethyl, isopropyl and the like, alkenyl having three to five carbon atoms, e.g., allyl, methallyl and the like or ω-hydroxy lower alkyl, i.e., ω-hydroxy lower alkyl having two to four carbon atoms, e.g., β-hydroxyethyl and the like;

$R^3$ is hydrogen, lower alkyl as defined above, alkenyl having three to five carbon atoms, ω-hydroxy lower alkyl as defined above or phenyl or $R^2$ and $R^3$ together with N represent

where Z is —$CH_2$—, —O— or $R^6$—N and $R^6$ is hydrogen, lower alkyl as defined above or ω-hydroxy lower alkyl as defined above;

$R^4$ represents hydrogen, lower alkyl as defined above, or alkenyl having two to five carbon atoms; and $R^5$ represents hydrogen, lower alkyl as defined above, alkenyl having two to five carbon atoms, phenyl, furyl, or thienyl, or pharmaceutically acceptable acid addition salts thereof.

The process for preparing the compounds of formula (I) in which $R^1$ is

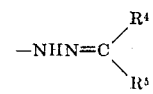

may be represented by the following general reaction scheme:

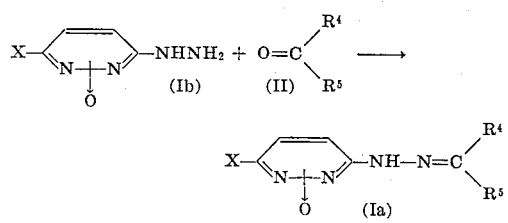

where O, X, $R^4$ and $R^5$ are as previously defined.

Compounds (Ia) are prepared by treating a compound of formula (Ib) with a carbonyl compound of the formula (II). The reaction may be carried out by treating compound (Ib) with compound (II) in excess carbonyl compound (II), or in a suitable solvent. However, because of the varying solubility characteristics of compounds (Ib), it is preferred that the reaction be carried out by suspending the acid addition salt form of compound (Ib) in an excess of carbonyl compound (II) and bubbling in ammonia gas. As the products (Ia) forms, ammonium salt precipitates and is removed by filtration. The reaction is generally carried out at a temperature of about 20° to 80°C. and preferably between about 20° to 30°C. If desired, an inert solvent such as lower alkanol, e.g., methanol or ethanol or aromatic or saturated aliphatic hydrocarbons, e.g., benzene, toluene, and the like may be used in place of excess carbonyl compound II. Neither the temperatures nor the solvent used are critical in obtaining the product (Ia). The pyridazines of formula (Ia) may be recovered using conventional techniques, e.g., evaporation and/or crystallization.

The compounds of formula (I) in which $R^1$ is hydrazine are prepared in accordance with the following general reaction scheme:

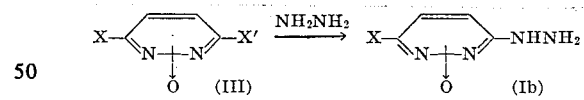

where O and X are as defined above and X' is halo having an atomic weight of about 35 to 80.

The compounds of formula (Ib) are prepared by treating compounds of formula (III) with hydrazine. The reaction is preferably but not necessarily carried out in the presence of an inert gas, e.g., nitrogen, helium or argon. The use of a solvent is not necessary, but lower alkanol such as methanol, ethanol and the like or preferably excess hydrazine may be used if desired. Although the temperature of the reaction is not critical, the reaction is generally carried out at temperatures between about 20° to 115°C., preferably between about 20° to 60°C. For optimum results, the reaction is run for about 1 to 24 hours. The product (Ib) in which X is

is recovered by conventional techniques, e.g., evaporation or crystallization as a salt. When X is halo, the process yields a mixture of 6-halo-3-hydrazinopyridazine N-oxide and 3-halo-6-hydrazinopyridazine-N-oxide which can be separated by conventional methods, e.g., chromatography.

When excess hydrazine is used as the solvent in the preparation of compounds (Ib), the hydrogen halide liberated in the process does not form an acid addition salt but reacts with excess hydrazine. Compounds (Ia) and (Ib) in base form may be converted into acid addition salts and vice versa by standard techniques.

The compounds of formula (III) in which X is other than halo, lower alkylamine, i.e., X is other than $$-\overset{H}{N}-(\text{lower alkyl})$$

or where X is other than piperidinyl are novel and represent another aspect of the invention. These compounds may be prepared according to the following reaction scheme:

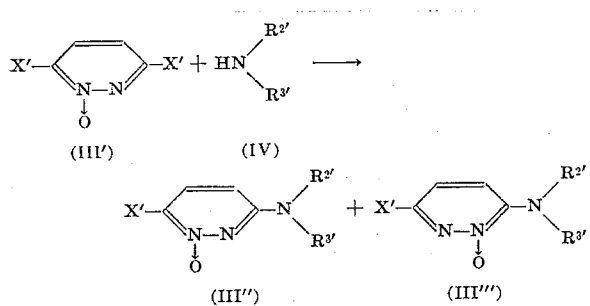

where O is oxygen and X' is as defined above and $R^{2'}$ and $R^{3'}$ are the same respectively as $R^2$ and $R^3$ as defined above with the proviso that

is other than lower alkylamine as defined above or piperidyl.

The pyridazine-N-oxides of formula (III'') and (III''') are prepared by treating 3,6-dihalo-pyridazine (III') with an appropriate amine (IV). Although the temperature is not critical, the reaction is normally carried out at a temperature between about 0° to 150°C., preferably between about 20° to 80°C., more preferably 20° to 30°C. Although not necessary, inert solvent may be used, preferably lower alkanols, especially methanol, ethanol and isopropanol. When feasible, excess reactant (IV) may also be used as solvent. The compounds (III'') and (III''') are separated and recovered using conventional techniques, e.g., fractional crystallization.

The compounds of formula (III''') can also be prepared in accordance with the following reaction scheme:

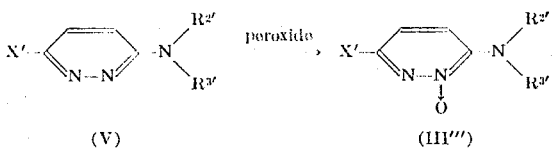

where X', $R^{2'}$, and $R^{3'}$ and the proviso are as defined above.

The compounds of formula (III''') are prepared by treating a compound of formula (V) with a peroxide in an organic acid solvent. The particular peroxide used is not critical but hydrogen peroxide is preferred. The organic acid solvent in which the reaction is carried out can be an organic acid such as acetic acid or propionic acid and the like, or mixtures or organic acid and water and/or organic acid anhydrides. The composition of the solvent is not critical. The temperature at which the reaction is run also is not critical, but it is preferred that the process be carried out at temperatures between about 50° to 100°C., preferably between 60° and 90°C. The time of the reaction is not critical, although for optimum results, it is preferred that it be run for one hour or more. The final product (III''') is recovered by conventional techniques, e.g., filtration and recrystallization.

Many of the compounds of formula (II), formula (III) in which X is halo, lower alkylamine, as defined above or piperidyl, formula (IV) and formula (V) are known and can be prepared by methods described in the literature. The compounds of formula (II), formula (III) in which X is halo, lower alkylamine or piperidyl, formula (IV) and formula (V) not specifically described in the literature can be prepared by analogous methods from known starting materials.

The compounds represented by formula (I) are useful because they possess pharmaceutical properties in animals. In particular, these compounds are useful as hypotensive/anti-hypertensive agents, as indicated by their activity in anesthetized dogs using a modification of the method described by Markowitz (Exper. Surgery, William & Wilkins, 2nd Ed., 1949) in which blood pressure is measured with a mercury manometer or transducer via a catheter inserted in either the carotid or femoral artery of the animal, and by their activity in the Grollman rat (A. Grollman Proc. Soc. Exp. Biol. and Med. 57: 103, 1944) in which the blood pressure from the caudal artery in the tail of the rat is indirectly measured using a pneumatic pulse transducer.

When so utilized the compounds may be combined with one or more pharmaceutically acceptable carriers or adjuvants. They may be administered orally or parenterally and, depending upon the compound employed and the mode of administration, the exact dosage utilized may vary. Furthermore, compounds (I) may be similarly administered in the form of their non-toxic pharmaceutically acceptable acid addition salts. Such salts possess the same order of activity as the free base and are readily prepared by standard methods as indicated above. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

In general, satisfactory results are obtained when these compounds are administered as hypotensive/antihypertensive agents at daily dosages of about 1.0 milligram to about 200 milligrams per kilogram of animal body weight. This daily dosage is preferably administered 2 to 4 times a day or in sustained release form. For most large animals such as primates, the total daily dosage is from about 50 milligrams to about 1,000 milligrams. Dosage forms suitable for internal use comprise from about 12.5 to about 500 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient | Parts by Weight |
|---|---|
| 6-Ethylamino-3-(2-isopropylidine-hydrazino)-pyridazine-N-oxide | 100 |
| Inert filler (lactose, kaolin, starch, etc.) | 200 |

EXAMPLE 1

6-Chloro-3-hydrazinopyridazine-N-oxide and 3-chloro-6-hydrazinopyridazine-N-oxide To a solution of 7.5 g. of 3,6-dichloropyridazine-N-oxide in 175 ml. of ethanol under nitrogen, 2.9 g. of anhydrous hydrazine is added with cooling and stirring. The reaction mixture is stirred 18 hours at room temperature after which the two components in the product, 6-chloro-3-hydrazinopyridazine-N-oxide and 3-chloro-6-hydrazinopyridazine-N-oxide are separated by column chromatography.

The fraction containing 6-chloro-3-hydrazinopyridazine-N-oxide is dissolved in 200 ml. methanol and hydrogen chloride gas is bubbled into the solution. The product, 6-chloro-3-hydrazinopyridazine-N-oxide hydrochloride is then recovered by evaporation and crystallization from methanol.

EXAMPLE 2

6-Chloro-3-(2-isopropylidene-hydrazino)pyridazine-N-oxide

Ammonia gas is bubbled into a suspension of 0.80 g. of 6-chloro-3-hydrazinopyridazine-N-oxide hydrochloride in 100 ml. of acetone for 20 minutes at room temperature. The reaction mixture is filtered to remove the ammonium chloride which precipitates and the filtrate volume is then reduced by evaporation. After cooling the filtrate, the product, 6-chloro-3-(2-isopropylidene-hydrazino)pyridazine-N-oxide is recovered by filtration.

When an equivalent amount of formaldehyde, acetaldehyde, diallylketone, benzaldehyde, α-thienylformaldehyde or furfural dissolved in 100 ml. of methyl alcohol is used in place of acetone in the above process, there is obtained 6-chloro-3-(2-methylidene-hydrazino)pyridazine-N-oxide; 6-chloro-3-(2-ethylidine-hydrazino)pyridazine-N-oxide; 6-chloro-3-(2-[1,6-heptadien-4-ylidene]hydrazino)pyridazine-N-oxide; 6-chloro-3-(2-benzylidene-hydrazino)pyridazine-N-oxide; 6-chloro-3-(2-[α-thenylidene]-hydrazino)pyridazine-N-oxide; 6-chloro-3-(2-furfurylidene-hydrazino)pyridazine-N-oxide; respectively.

EXAMPLE 3

3-Chloro-6-(2-isopropylidene-hydrazino)pyridazine-N-oxide

Ammonia is bubbled into a suspension of 0.8 g. of 3-chloro-6-hydrazinopyridazine-N-oxide hydrochloride in 100 ml. of acetone for 30 minutes at room temperature. The reaction mixture is filtered to remove the ammonium chloride which precipitates and the filtrate volume is then reduced by evaporation. After cooling the filtrate, the product, 3-chloro-6-(2-isopropylidene-hydrazino)pyridazine-N-oxide is recovered by filtration.

When an equivalent amount of formaldehyde, acetaldehyde, diallylketone, benzaldehyde, α-thienylformaldehyde or furfural dissolved in 100 ml. of methyl alcohol is used in place of acetone in the above process, there is obtained 3-chloro-6-(2-methylidene-hydrazino)pyridazine-N-oxide; 3-chloro-6-(2-ethylidene-hydrazino)pyridazine-N-oxide; 3-chloro-6-(2-[1,6-heptadien-4-ylidene]hydrazino)pyridazine-N-oxide; 3-chloro-6-(2-benzylidene-hydrazino)pyridazine-N-oxide; 3-chloro-6-(2-[αthenylidene]-hydrazino)pyridazine-N-oxide; 3-chloro-6-(2-furfurylidene-hydrazino)pyridazine-N-oxide, respectively.

EXAMPLE 4

6-Chloro-3-(2-[1-methylbutylidene]hydrazino)pyridazine-N-oxide

Ammonia gas is bubbled into a suspension of 3.0 g. of 6-chloro-3-hydrazinopyridazine-N-oxide hydrochloride in 75 ml. of 2-pentanone for 0.5 hour at room temperature. The reaction mixture is filtered to remove the ammonium chloride formed and the filtrate volume is then reduced by evaporation. The filtrate is then cooled; and the product, 6-chloro-3-(2-[1-methylbutylidene]hydrazino)pyridazine-N-oxide is recovered by filtration.

EXAMPLE 5

3-Ethylamino-6-chloropyridazine-N-oxide and 6-ethylamino-3-chloropyridazine-N-oxide A mixture of 3 g. of 3,6-dichloropyridazine-N-oxide, 100 cc. of ethyl alcohol and 2 cc. of 70 percent aqueous solution of ethylamine is placed in a sealed tube and heated on a steam bath for 4 hours. The solvent is evaporated, the residue is taken up in a small amount of water and NaHCO$_3$, and extracted with CHCl$_3$. The CHCl$_3$ layer is dried over anhydrous Na$_2$SO$_4$ and CHCl$_3$ is evaporated. The residue is recrystallized from benzene and colorless needles of 3-ethylamino-6-chloropyridazine-N-oxide are obtained. The benzene is evaporated from the mother liquor and the residue is recrystallized from petroleum benzin. Colorless needles of 6-ethylamino-3-chloropyridazine-N-oxide are obtained.

When an equivalent amount of ammonia, dimethylamine, diallylamine, diethanolamine, or aniline is used in place of the ethylamine above, there is obtained after separation 3-amino-6-chloropyridazine-N-oxide and 6-amino-3-chloropyridazine-N-oxide from the ammonia; 3-dimethylamino-6-chloropyridazine-N-oxide and 6-dimethylamino-3-chloropyridazine-N-oxide from the dimethylamine; 3-diallylamino-6-chloropyridazine-N-oxide and 6-diallylamino-3-chloropyridazine-N-oxide from the diallylamine; 3-diethanolamino-6-chloropyridazine-N-oxide and 6-diethanolamino-3-chloropyridazine-N-oxide from the diethanolamine; or 3-anilino-6-chloropyridazine-N-oxide and 6-anilino-3-chloropyridazine-N-oxide from the aniline.

EXAMPLE 6

3-Piperidino-6-chloropyridazine-N-oxide

A mixture of 2 g. of 3,6-dichloropyridazine-N-oxide, 30 cc. of ethyl alcohol and 4 g. of piperidine is placed in a sealed tube and heated on a steam bath for 4 hours. The solvent is distilled off, the residue is taken up in a small amount of water and NaHCO$_3$, and extracted with CHCl$_3$. The CHCl$_3$ layer is dried over anhydrous Na$_2$SO$_4$ and then is evaporated to dryness. The yellow residue is recrystallized from isopropyl ether, and colorless scales of 3-piperidino-6-chloropyridazine-N-oxide are obtained.

When an equivalent amount of morpholine, piperazine, N-methylpiperazine or N-β-hydroxyethyl-piperazine is used in place of the piperidine above, there is obtained 3-morpholino-6-chloropyridazine-N-oxide; 3-piperazino-6-chloropyridazine-N-oxide; 3-(4-methyl-piperazino)-6-chloropyridazine-N-oxide; or 3-(4-β-hydroxyethylpiperazino)-6-chloropyridazine-N-oxide, respectively.

EXAMPLE 7

6-Ethylamino-3-chloropyridazine-N-oxide

To a solution of 1.0 g. of 3-ethylamino-6-chloropyridazine in 7 ml. of glacial acetic acid, 1 ml. of 30% H$_2$O$_2$ is added, and the mixture heated at 65°C. for 2 hours. To the mixture, 1 ml. more of 30% H$_2$O$_2$ is added and heating is continued for over 7 hours. After distilling off the solvent in vacuo, the residue is neutralized with NaHCO$_3$ adding simultaneously some water. The solution is extracted with CHCl$_3$, after which the CHCl$_3$ layer is dried over anhydrous Na$_2$SO$_4$ and concentrated to dryness. The residue is recrystallized from isopropyl ether or petroleum benzin to yield 6-ethylamino-3-chloropyridazine-N-oxide.

When an equivalent amount of 3-morpholino-6-chloropyridazine, 3-piperidino-6-chloropyridazine, 3-piperazino-6-chloropyridazine, 3-(N-methylpiperazino)-6-chloropyridazine, or 3-(N-β-hydroxyethylpiperazino)-6-chloropyridazine is used in place of the 3-ethylamino-6-chloropyridazine above, there is obtained 6-morpholino-3-chloropyridazin-N-oxide; 6-piperidino-3-chloropyridazine-N-oxide; 6-piperazino-3-chloropyridazine-N-oxide; 6-(N-methylpiperazino)-3-chloropyridazine-N-oxide; 6-(N-β-hydroxyethylpiperazino)-3-chloropyridazine-N-oxide; respectively.

EXAMPLE 8

6-Ethylamino-3-hydrazinopyridazine-N-oxide hydrochloride

Into a flask equipped with a stirrer, 8.9 g. of 6-ethylamino-3-chloropyridazine-N-oxide prepared as in Example 5 and 127 g. of anhydrous hydrazine are added under nitrogen. The mixture is heated to 50°C. and stirred for 21 hours. The reaction mixture is evaporated to dryness under vacuum and the residue is dissolved in 80 ml. of methanol. Hydrogen chloride gas is bubbled into the solution for 20 minutes to precipitate hydrazine dihydrochloride which is separated by filtration.

The methanolic filtrate is evaporated to dryness under vacuum and the residue is dissolved in 100 ml. of isopropanol and saturated with hydrogen chloride gas. The product, 6-ethylamino-3-hydrazinopyridazine-N-oxide hydrochloride (m.p. 175°–176°C.) which separates, is recovered by filtration.

When the above process is carried out using an equivalent amount of 3-ethylamino-6-chloropyridazine-N-oxide; 3-amino-6-chloropyridazine-N-oxide; 6-amino-3-chloropyridazine-N-oxide; 3-dimethylamino-6-chloropyridazine-N-oxide; 6-dimethylamino-3-chloropyridazine-N-oxide; 3-diallylamino-6-chloropyridazine-N-oxide; 6-diallylamino-3-chloropyridazine-N-oxide; 3-diethanolamino-6-chloropyridazine-N-oxide; 6-diethanolamino-3-chloropyridazine-N-oxide; 3-anilino-6-chloropyridazine-N-oxide; 6-anilino-3-chloropyridazine-N-oxide; 3-piperidino-6-chloropyridazine-N-oxide; 6-piperidino-3-chloropyridazine-N-oxide; 3-morpholino-6-chloropyridazine-N-oxide; 6-morpholino-3-chloropyridazine-N-oxide; 3-piperazino-6-chloropyridazine-N-oxide; 6-piperazino-3-chloropyridazine-N-oxide; 3-(4-methylpiperazino)-6-chloropyridazine-N-oxide; 6-(4-methylpiperazino)-3-chloropyridazine-N-oxide; 3-(4-β-hydroxyethylpiperazino)-6-chloropyridazine-N-oxide or 6-(4-β-hydroxyethylpiperazino)-3-chloropyridazine-N-oxide in place of the 6-ethylamino-3-chloropyridazine above, there is obtained the hydrochloride salt of 3-ethylamino-6-hydrazinopyridazine-N-oxide; 3-amino-6-hydrazinopyridazine-N-oxide; 6-amino-3-hydrazinopyridazine-N-oxide; 3-dimethylamino-6-hydrazinopyridazine-N-oxide; 6-dimethylamino-3-hydrazinopyridazine-N-oxide; 3-diallylamino-6-hydrazinopyridazine-N-oxide; 6-diallylamino-3-hydrazinopyridazine-N-oxide; 3-diethanolamino-6-hydrazinopyridazine-N-oxide; 6-diethanolamino-3-hydrazinopyridazine-N-oxide; 3-anilino-6-hydrazinopyridazine-N-oxide; 6-anilino-3-hydrazinopyridazine-N-oxide; 3-piperidino-6-hydrazinopyridazine-N-oxide; 6-piperidino-3-hydrazinopyridazine-N-oxide; 3-morpholino-6-hydrazinopyridazine-N-oxide; 6-morpholino-3-hydrazinopyridazine-N-oxide; 3-piperazino-6-hydrazinopyridazine-N-oxide; 6-piperazino-3-hydrazinopyridazine-N-oxide; 3-(4-methylpiperazino)-6-hydrazinopyridazine-N-oxide; 6-(4-methylpiperazino)-3-hydrazinopyridazine-N-oxide; 3-(4-β-hydroxyethylpiperazino)-6-hydrazinopyridazine-N-oxide or 6-(4-β-hydroxyethylpiperazino)-3-hydrazinopyridazine-N-oxide, respectively.

EXAMPLE 9

6-Ethylamino-3-(2-isopropylidene-hydrazino)pyridazine-N-oxide

Into a stirred suspension of 1.5 g. of 6-ethylamino-3-hydrazinopyridazine-N-oxide hydrochloride in 400 ml. of acetone, ammonium gas is bubbled for 20 minutes. The insoluble ammonium chloride which forms is collected by filtration. The filtrate is evaporated down to about 200 ml. and the product, 6-ethylamino-3-(2-isopropylidene-hydrazino)pyridazine-N-oxide which precipitates is recovered by filtration.

Following the above procedure but using an equivalent amount of the hydrochloride salt of 3-ethylamino-6-hydrazinopyridazine-N-oxide; 3-amino-6-hydrazinopyridazine-N-oxide; 6-amino-3-hydrazinopyridazine-N-oxide; 3-dimethylamino-6-hydrazinopyridazine-N-oxide; 6-dimethylamino-3-hydrazinopyridazine-N-oxide; 3-diallylamino-6-hydrazinopyridazine-N-oxide; 6-diallylamino-3-hydrazinopyridazine-N-oxide; 3-diethanolamino-6-hydrazinopyridazine-N-oxide; 6-diethanolamino-3-hydrazinopyridazine-N-oxide; 3-anilino-6-hydrazinopyridazine-N-oxide; 6-anilino-3-hydrazinopyridazine-N-oxide; 3-piperidino-6-hydrazinopyridazine-N-oxide; 6-piperidino-3-hydrazinopyridazine-N-oxide; 3-morpholino-6-hydrazinopyridazine-N-oxide; 6-morpholino-3-hydrazinopyridazine-N-oxide; 3-piperazino-6-hydrazinopyridazine-N-oxide; 6-piperazino-3-hydrazinopyridazine-N-oxide; 3-(4-methylpiperazino)-6-hydrazinopyridazine-N-oxide; 6-(4-methylpiperazino)-3-hydrazinopyridazine-N-oxide; 3-(4-β-hydroxyethylpiperazino)-6-hydrazinopyridazine-N-oxide; or 6-(4-β-hydroxyethylpiperazino)-3-hydrazinopyridazine-N-oxide in place of the 6-ethylamino-3-hydrazinopyridazine-N-oxide, there is obtained 3-ethylamino-6-(2-isopropylidene-hydrazino)pyridazine-N-oxide; 3-amino-6-(2-isopropylidene-hydrazino)pyridazine-N-oxide; 6-amino-3-(2-isopropylidene-hydrazino)pyridazine-N-oxide; 3-dimethylamino-6-(2-isopropylidene-hydrazino)pyridazine-N-oxide; 6-dimethylamino-3-(2-isopropylidene-hydrazino)pyridazine-N-oxide; 3-diallylamino-6-(2-isopropylidene-hydrazino)pyridazine-N-oxide; 6-diallylamino-3-(2-isopropylidene-hydrazino)pyridazine-N-oxide; 3-diethanolamino-6-(2-isopropylidene-hydrazino)pyridazine-N-oxide; 6-diethanolamino-3-(2-isopropylidene-hydrazino)pyridazine-N-oxide; 3-anilino-6-(2-isopropylidene-hydrazinol)-pyridazine 6-anilino-3-(2-isopropylidene-hydrazino)pyridazine-N-oxide; 3-piperidino-6-(2-isopropylidene-hydrazino)pyridazine-N-oxide; 6-piperidino-3-(2-isopropylidene-hydrazino)pyridazine-N-oxide; 3-morpholino-6-(2-isopropylidene-hydrazino)pyridazine-N-oxide; 6-morpholino-3-(2-isopropylidene-hydrazino)pyridazine-N-oxide; 3-piperazino-6-(2-isopropylidene-hydrazino)-pyridazine-N-oxide; 6-piperazino-3-(2-isopropylidene-hydrazino)pyridazine-N-oxide; 3-(4-methylpiperazino)-6-(2-isopropylidene-hydrazino)pyridazine-N-oxide; 6-(4-methylpiperazino)-3-(2-isopropylidene-hydrazino)pyridazine-N-oxide; 3-(4-β-hydroxymethylpiperazino)-6-(2-isopropylidene-hydrazino)pyridazine-N-oxide; or 6-(4β-hydroxymethylpiperazino)-3-(2-isopropylidene-hydrazino)pyridazine-N-oxide, respectively.

EXAMPLE 10

6-Ethylamino-3-[2-(1-methylbutylidene)hydrazino]pyridazine-N-oxide

Ammonia gas is bubbled into a suspension of 3.0 g of 6-ethylamino-3hydrazinopyridazine-N-oxide hydrochloride in 75 ml of 2-pentanone for 0.5 hour at room temperature. The reaction mixture is filtered to remove the ammonium chloride formed and the filtrate volume is then reduced by evaporation. The filtrate is then cooled; and the product, 6-ethylamino-3-[2-(1-methylbutylidene) hydrazino]pyridazine-N-oxide is recovered by filtration.

When an equivalent amount of formaldehyde, acetaldehyde, diallylketone, benzaldehyde α-thienylformaldehyde or furfural dissolved in 100 ml of methyl alcohol is used in place of acetone in the above process, there is obtained 6-ethylamino-3-(2-methylidene-hydrazino)pyridazine-N-oxide; 6-ethylamino-3-(2-ethylidine-hydrazino)pyridazine-N-oxide; 6-ethylamino-3-(2-[1,6-heptadien-4-ylidene]hydrazino)pyridazine-N-oxide; 6-ethylamino-3-(2-benzylidene-hydrazino)pyridazine-N-oxide; 6-ethylamino-3-(2-[α-thenylidene]-hydrazino)pyridazine-N-oxide; or 6-ethylamino-3-(2-furfurylidene-hydrazino)pyridazine-N-oxide; respectively.

What is claim is:

1. A compound of the formula

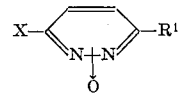

where
O is oxygen and is bonded to either nitrogen in the ring;
X is halo having an atomic weight of about 35 to 80

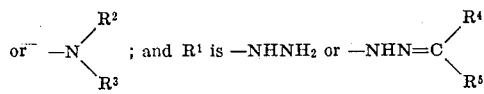

where
R² represents hydrogen, lower alkyl, alkenyl having three to five carbon atoms, or ω-hydroxy lower alkyl;
R³ is hydrogen, lower alkyl, alkenyl having three to five carbon atoms, ω-hydroxy lower alkyl, phenyl or
R² and R³ together with N represent

where Z is —CH₂—, —O— or R⁶—N< and

R⁶ represents hydrogen, lower alkyl or ω-hydroxy lower alkyl;

$R^4$ represents hydrogen, lower alkyl or alkenyl having two to five carbon atoms and $R^5$ represents hydrogen, lower alkyl, alkenyl having two to five carbon atoms, phenyl, furyl, or thienyl or a pharmaceutically acceptable acid addition salt thereof.

2. The compound of claim 1 which is 6-chloro-3-hydrazinopyridazine-N-oxide.

3. The compound of claim 1 which is 6-chloro-3-(2-isopropylidinehydrazino)pyridazine-N-oxide.

4. The compound of claim 1 which is 6-chloro-3-[2-(1-methyl-butylidene)hydrazino]pyridazine-N-oxide.

5. The compound of claim 1 which is 6-ethylamino-3-hydrazinopyridazine-N-oxide.

6. The compound of claim 1 which is 6-ethylamino-3-(2-isopropylidenehydrazino)pyridazine-N-oxide.

7. A process for preparing a compound of the formula

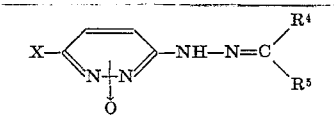

which comprises treating a compound of the formula

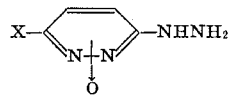

with a carbonyl compound of the formula

where O, X, $R^4$ and $R^5$ are as defined in claim 1.

8. A process for preparing a compound of the formula

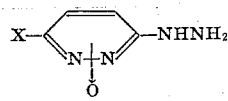

which comprises treating a compound of the formula

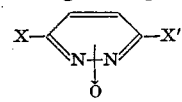

with hydrazine
where
$X'$ is halo having an atomic weight of about 35 to 80 and
O and X are as defined in claim 1.

9. A compound of the formula

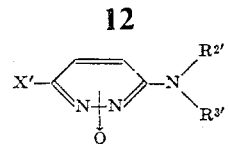

where
$X'$ is halo having an atomic weight of about 35 to 80, and

O, $R^{2'}$ and $R^{3'}$ are the same respectively as O, $R^2$ and $R^3$ as defined in claim 1, provided

is other than lower alkylamino or piperidyl, or a pharmaceutically acceptable acid addition salt thereof.

10. A process for preparing a compound of the formula

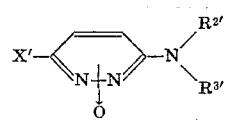

which comprises treating a compound of the formula

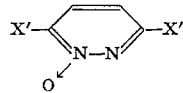

with an amine of the formula

where O, $X'$, $R^{2'}$, $R^{3'}$ and the proviso are as set out in claim 9.

11. A process for preparing a compound of the formula

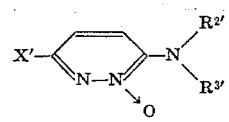

which comprises treating a compound of the formula

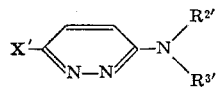

with a peroxide in an organic acid solvent,
where $X'$, $R^{2'}$, $R^{3'}$ and the proviso are as set out in claim 9.

* * * * *